E. E. WHEELER.
Clamps for Mending Carriage-Wheels.
No. 149,173. Patented March 31, 1874.
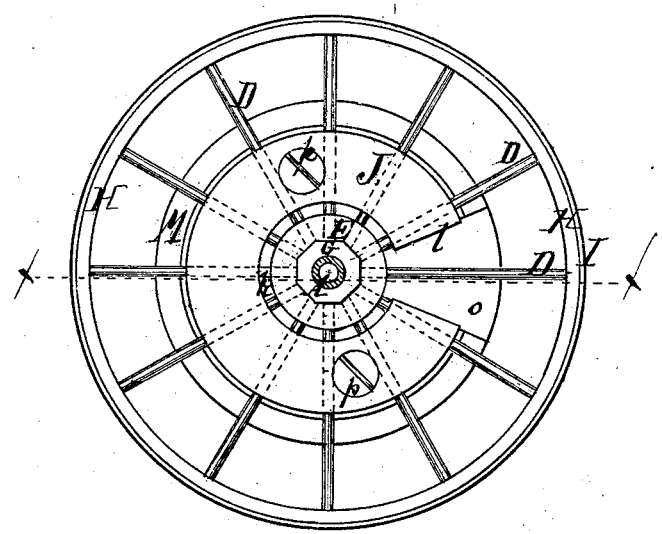
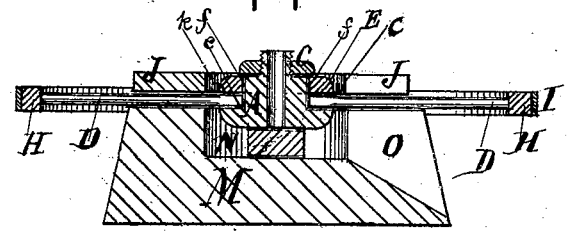

UNITED STATES PATENT OFFICE.

EVERITT E. WHEELER, OF SOUTH NORWALK, CONNECTICUT, ASSIGNOR TO RUSSEL B. HOYT, OF SAME PLACE.

IMPROVEMENT IN CLAMPS FOR MENDING CARRIAGE-WHEELS.

Specification forming part of Letters Patent No. 149,173, dated March 31, 1874; application filed February 4, 1874.

*To all whom it may concern:*

Be it known that I, EVERITT E. WHEELER, of South Norwalk, county of Fairfield, State of Connecticut, have invented certain Improvements in Clamps for Mending Carriage-Wheels, of which the following is a specification:

The object of my invention is to provide a device by which the spokes of wheels for vehicles can be keyed up in case they become loose, or a broken spoke can be removed without taking the wheel apart.

In order to prevent the wheel from coming apart when the flange of the hub against the spokes is removed, a double clamp is employed which will hold the parts temporarily together. In order to remove and replace the spoke, or to place a wedge under the end of the same in the groove in the hub, a flange is bolted onto the side of the hub.

My invention consists in the construction of a circular clamp, having a recess cut into the same in the center and the side, in order to admit therein the end of the hub, and to readily get at one of the spokes. Another circular clamp, with an opening sufficiently large to free readily one spoke, is placed around the other side of the hub. Thus all the spokes of the wheel, with the exception of the one which is to be removed or repaired, are placed between both of these circular clamps, which are held together by screws placed between the spokes.

In order to more fully describe my invention, I refer to the accompanying drawing, forming a part of this specification.

Figure I is a plan view of a wheel with clamps embodying my invention. Fig. II is a sectional view through line $x$ $x$, Fig. I.

A is a hub, with grooves $c$ $c$ for the spokes D D. E is the circular flange, with opening $f$. G is the screw-cap. H H are the fellies; I, the tire. J is the circular clamp with recess $k$ in the center, and recess $l$ in the side. M is the other circular clamp with opening N and hole O in the center. $p$ $p$ are screws which hold both clamps together.

Having thus described my invention, I desire to claim—

The circular clamps J and M, in combination with the screws $p$ $p$, substantially as and for the purpose set forth.

EVERITT E. WHEELER.

Witnesses:
 RICHARD GERNER,
 FRANKLIN BARRITT.